United States Patent

[11] 3,532,114

[72] Inventor Joseph H. De Frees,
414 Liberty St., Warren, Pennsylvania 16365
[21] Appl. No. 716,920
[22] Filed March 28, 1968
[45] Patented Oct. 6, 1970

[54] VALVE
2 Claims, 4 Drawing Figs.
[52] U.S. Cl. ................................................. 137/493.3, 137/588
[51] Int. Cl. ................................................. F16k 17/18, F16k 45/00
[50] Field of Search ................................. 137/493—493.9, 557, 588

[56] References Cited
UNITED STATES PATENTS

| 526,177 | 9/1894 | Blair | 137/493.4 |
| 693,431 | 2/1902 | Osbourn | 137/493.4 |
| 1,604,443 | 10/1926 | Crickmer | 137/493.5 |
| 1,942,313 | 1/1934 | Viele et al | 137/493.3 |
| 2,133,200 | 10/1938 | Kenneweg | 137/493.3 |
| 2,489,216 | 11/1949 | Folmsbee | 137/493.3 |
| 2,707,967 | 5/1955 | Adams et al. | 137/588X |
| 2,732,971 | 1/1956 | Holmes et al. | 137/493.3X |
| 3,042,061 | 7/1962 | Dobrikin | 137/557X |
| 3,385,318 | 5/1968 | Kilbourn | 137/588X |

FOREIGN PATENTS

| 742,451 | 12/1955 | Great Britain | 137/557 |
| 72,273 | 6/1947 | Norway | 137/493.3 |

Primary Examiner—Henry T. Klinksiek
Attorney—Baldwin, Egan, Walling and Fetzer

ABSTRACT: A fluid pressure relief valve for the vent opening in a fluid storage tank including a safety valve poppet reciprocable to and from the vent opening and displaceable to an open position when fluids interiorly of the tank exceed a predetermined pressure. The poppet has a vacuum vent aperture with a vacuum disk reciprocable to and from such aperture, such disk being displaceable inwardly of the tank to open position when fluids interiorly of the tank fall below a predetermined pressure. Thus, the valve is provided with inbreathing and outbreathing means. The poppet has an open-ended longitudinal bore with a pressure gage rod reciprocally disposed in such poppet bore and adapted to selectively extend partially outwardly of the tank to indicate tank interior fluid pressures.

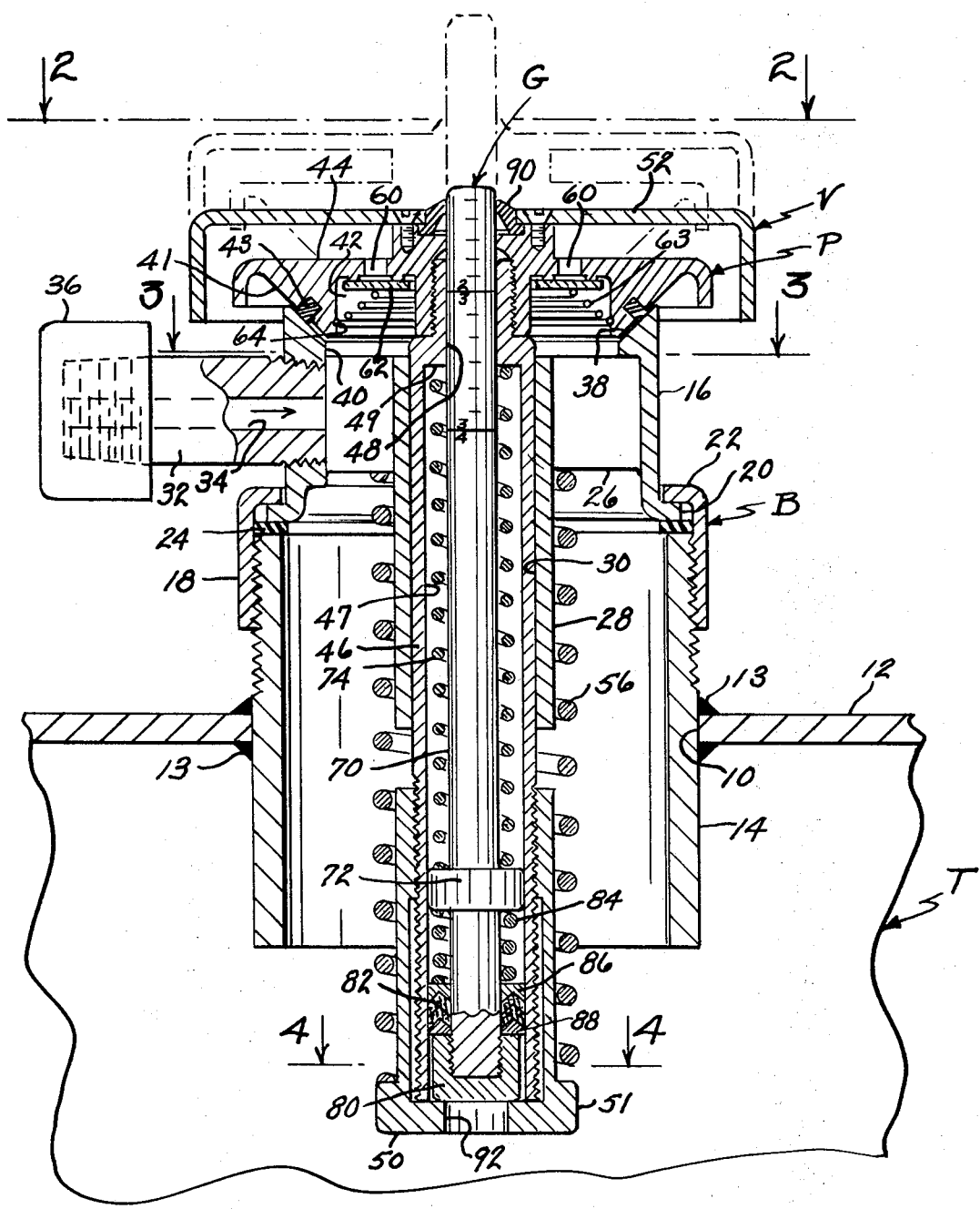

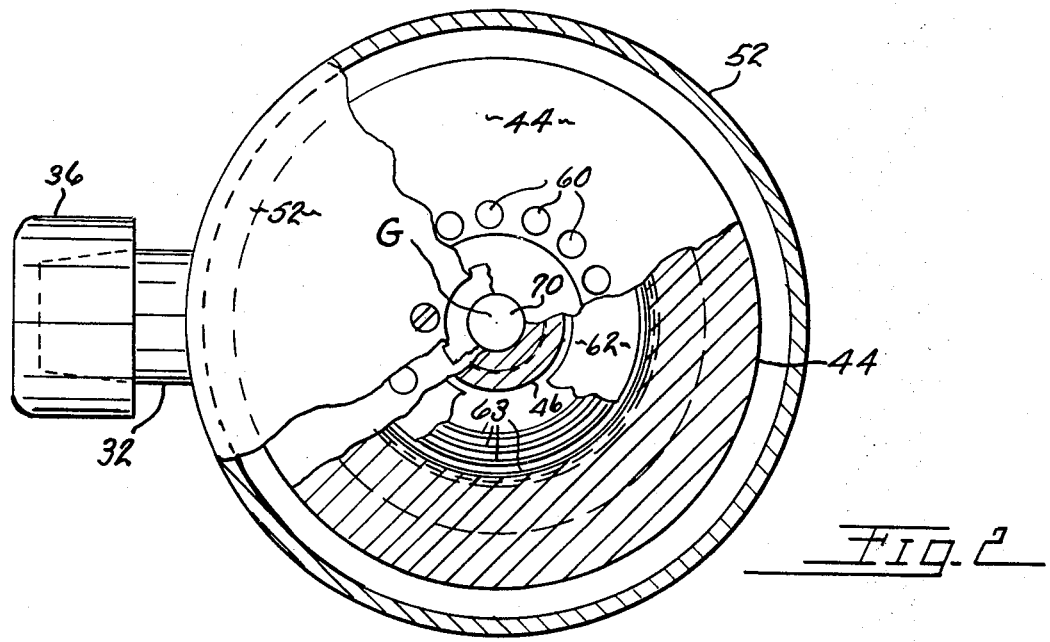
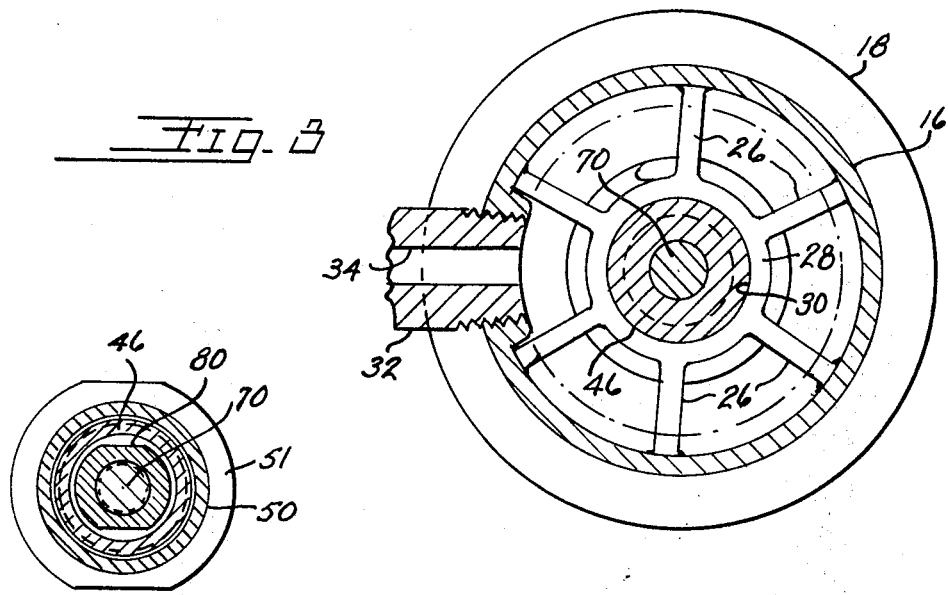

VALVE

This invention relates to valves and more particularly to fluid pressure relief valves used in connection with tanks or containers for the storage or transportation of fluids.

There has long been a need for a simple, efficient and highly effective fluid tank relief valve used for pressure unloading of fluids interiorly of the tank. Prior pressure unloading vent valves have numerous shortcomings such as expensive, complicated structures that are difficult to disassemble for cleaning and repair, and do not provide both inbreathing and outbreathing. Additionally, such valves lack compactness and require substantial overhead clearance. Pressure gages on such valves become plugged with viscous fluids, cannot be easily cleaned, and become unreliable, inoperative and contaminated.

Therefore it is an object of the present invention to provide a pressure relief valve that is compact and requires relatively little overhead clearance.

A further object of the invention is to provide a pressure relief valve having a pressure gage that is less apt to clog.

A further object of the invention is to provide a valve of the above type that is easy to disassemble for cleaning and repair purposes.

A further object of the invention is to provide a valve of the above type having both inbreathing and outbreathing means.

A further object of the invention is to provide a valve of the above type that is simple in construction, inexpensive to manufacture, and highly effective in operation.

Briefly, the foregoing objects are accomplished by the provision of a fluid pressure unloading relief valve for the vent opening in a fluid storage tank including a poppet selectively reciprocable to and from such vent opening and displaceable to open position when fluids interiorly of the tank exceed a predetermined pressure. The poppet has an annular head having a plurality of circumferentially disposed vacuum vent apertures with a vacuum disk ring reciprocable to and from such apertures, the disk being displaceable inwardly of the tank when fluids interiorly of the tank fall below a predetermined pressure. A pressure-indicating gage rod is reciprocally disposed in the longitudinal bore of the poppet, such rod being adapted to selectively extend upwardly beyond the top of the tank to indicate tank interior pressures. The valve contains a top hood which covers the valve to keep out dirt and dust therefrom. A metering orifice assembly is disposed in the side of the valve body for pressure unloading of the tank in the usual manner. A metering orifice is dimensioned to limit fluid flow to the capacity of the poppet discharge. A valve or pipe cap covers the metering orifice when not used for pressure unloading. Thus, the valve is of simplified construction and may be easily and quickly removed from the tank for cleaning and repair.

Other objects and advantages of the invention will be apparent from the following description taken in conjunction with the drawings wherein:

FIG. 1 is a side elevational sectional view of a valve constructed in accordance with the invention, and showing in dot-dash lines the poppet and dust cover in open position;

FIG. 2 is a view, partly in section, taken along the line 2–2 of FIG. 1;

FIG. 3 is a view taken along the lines 3–3 of FIG. 1; and

FIG. 4 is a view taken along the line 4–4 of FIG. 1.

Although the invention is shown and described herein with reference to fluid storage tanks, it will be understood that it may be applied to any type of fluid container.

Referring first to Fig. 1, there is shown a tank unloading fluid pressure vent or relief valve of the invention, generally designated as V, mounted in the opening 10 formed in the top wall 12 of a fluid storage tank T. The valve includes as main components a base B, an exhaust safety valve poppet P, and a pressure indicating gage or rod G.

The base B includes an annular pipe member 14 positioned in the tank opening 10 of the tank top wall 12 and welded to such wall as at 13, an annular tubular valve body 16 disposed on and secured to the pipe 14, and a collar 18 threaded onto the pipe 14 and thus securing the body 16 to the pipe member 14 via the coacting overlapping flanges 20 and 22 on the body and pipe member respectively. A gasket 24 may be disposed between the body 16 and pipe 14 to form a fluid seal therebetween. The valve body 16 includes a plurality of radial support arms 26 extending radially inwardly from the body (as best shown in Fig. 3), said valve body further including a central, vertically-disposed guide sleeve 28 (Fig. 1) secured to the inner ends of the arms 26. The sleeve 28 contains a centrally-disposed, longitudinal guide sleeve bore 30.

Disposed in the side of the valve body 16 is a regulator or metering orifice tube or assembly 32 having a longitudinal, open-ended, metering orifice 34 connecting the tank interior with the tank exterior and used for pressure unloading of the tank T in conventional manner. In practice, pressurized air or nitrogen is introduced through the orifice 34 to unload the tank T of fluid. A pipe cap 36 (or valve) is secured to the outer end of the metering orifice tube 32 when such metering tube is not used for pressure unloading of the tank. The upper end of the body 16 is formed into a tapered valve seat 38 and forming the valve vent opening 40. In effect, the body 16 forms an upper extension of the pipe 14, with the vent opening 40 disposed at the top thereof.

The poppet P includes an annular head 44 having a poppet stem 46 threaded or otherwise secured thereto and extending downwardly from the center of the head and reciprocally disposed in the guide sleeve bore 30, whereby the poppet head 44 is reciprocable to and from the valve seat 38 and the vent opening 40 to selectively seal the same. The poppet head 44 includes an annular, downwardly-extending, tapered collar 41 spaced from and encircling the upper portion of the poppet stem to form an annular cavity 42 therebetween, said cavity being open-ended at its lower end in communication with the tank interior. The tapered collar 41 has a gasket seal 43 positioned in its surface to seal the joint with the adjacent coacting valve seat 38. The stem 46 has an open-ended, longitudinal poppet stem bore or poppet bore 47 connecting the tank interior with the tank exterior, with the top section of such bore having a restricted portion 48 to form an annular, interior stem bore shoulder 49, such bore 47 extending longitudinally through the stem 46. The lower portion of the stem 46 is formed by a nut 50 threaded on the bottom end of the stem, such nut having an outwardly extending annular flange 51. Thus, in effect, the stem 46 has an outwardly extending flange 51 on the lower end hereof. Secured to the top side of the poppet head 44 is a dust cover hood 52, which is spaced from and covers the entire valve V to keep dirt and dust therefrom.

A poppet bias means is provided for retaining the poppet P in a normally closed position against the vent opening 40, such bias means, in the preferred form, comprising a coil spring 56 encircling the sleeve 28, such spring being compressed between the support arms 26 and the flange 51.

In operation, when fluids in the tank T exceed a predetermined pressure, such pressurized fluids act against the underside of the poppet head 44 and lift the poppet P off of its seat 38 and off the vent opening 40 (to the position shown in dot-dash lines in Fig. 1) thereby venting such pressurized fluids to the tank exterior. Thus, the poppet P is disposed exteriorly of the tank T and is reciprocable to and from the vent opening 40.

It will be understood that poppet spring 56 is designed to keep the poppet P in normally closed position until fluids interiorly of the tank exceed a predetermined pressure, such predetermined pressure being more than the normal pressure employed to pressure unload the tank. In connection with this, the metering orifice 34 is dimensioned to limit the flow of unloading pressurized gases therethrough to the capacity of the poppet. In other words, if gas or air is admitted to the tank T faster than the fluid product is being discharged and tank internal pressure builds up, exhaust valve poppet P moves upwardly and causes such air or gas to exhaust to the atmosphere, thus insuring tank pressure within safe limits.

A vacuum vent aperture means leading from the tank interior to the tank exterior is provided in the poppet head 44 in the form of a plurality of apertures 60 as best shown in Figs. 1 and 2, such apertures being disposed circumferentially in such head and forming a communication between the cavity 42 (and thus the tank interior) and the exterior of the tank. The vent aperture means also includes a vacuum disk 62 positioned on the underside of the poppet head 44 and reciprocable to and from the apertures 60 to selectively seal the same. To retain the disk 62 in a normally closed position against the apertures 60, a disk bias means is provided in the form of a tapered coil spring 63 positioned at its lower end in the annular groove 64 formed in the lower portion of the inner surface of the collar 41, and with the upper end of the spring abutting against the disk 62, said spring 63 encircling the upper portion of the stem 46.

In operation, when fluids interiorly of the tank T fall below a predetermined pressure, as may happen if pressurizing air fails, atmospheric pressure exteriorly of the tank forces the disk 62 downwardly or inwardly of the tank T against the action of the spring 63 thereby opening the apertures 60 to relieve the vacuum interiorly of the tank. Thus, protection against collapse of the tank T is provided. With pressure unloading, should the product discharge rate exceed the rate air is admitted to the tank T (because of inadvertent failure to open valves, etc.) the partial vacuum is relieved by admission of air through the vacuum apertures 60 as above described.

Reciprocally disposed in the poppet stem bore 47 (and in its restricted portion 48) is a gage mechanism in the form of a piston-type pressure gage plunger or rod 70 having an outwardly extending annular rod flange ring 72 adjacent and spaced from the lower end of the rod 70. A suitable pressure gage rod bias means is provided in the form of a coil spring 74 compressed between the flange ring 72 and the stem bore shoulder 49, for normally retaining the pressure gage rod 70 substantially within the poppet bore 47 when tank interior fluid pressure does not exceed pressure exteriorly of the tank.

To prevent pressurized fluids interiorly of the tank from escaping to the tank exterior through the poppet stem bore 47, a suitable fluid seal packing means is provided at the lower end of the gage rod 70. Such packing means includes a rod nut 80 (FIGS. 1 and 4) threaded on to the lower end of the gage rod 70, packing 82 (FIG. 1) disposed above the nut 80 and encircling the rod 70, and a coiled spring 84 compressed between the flange ring 72 and the packing 82. The packing 82 is confined between the washers 86 and 88. Thus, the spring 84 is disposed in the lower end of the poppet bore 47 below the rod flange ring 72 and is disposed (longitudinally) in the space between the pressure gage rod 70 and the inner longitudinal wall of the poppet bore 47. The rod nut 80, in coaction with the spring 84, biases the packing means or packing 82 in such space. A ring wiper 90 is provided at the top of the rod 70 to prevent dirt and water from entering the gage mechanism.

Accordingly, the piston type pressure gage rod 70 is actuated by tank pressure, (through the nut opening 92 and acting on the underside of the nut 80) which compresses the gage rod spring 74 whereby the gage rod 70 rises and a visual indication is given by the extent the rod 70 is exposed above the top of the valve V. In other words, when fluids interiorly of the tank T exceed tank exterior pressure (i.e. exceed atmospheric pressure) such pressurized fluids interiorly of the tank act against the gage rod nut 80 (through the nut opening 92) and force the pressure gage rod 70 upwardly against the bias of spring 74 so that the gage rod upper end extends outwardly beyond the top of the valve V (and thus beyond the top of the tank T) as shown in dot-dash lines in FIG. 1. The gage rod 70 may be provided with suitable indicia, as shown, and thus provide direct readings of tank interior pressures.

The valve V may be very quickly removed from the tank T for cleaning and repair purposes simply by unscrewing the collar 18.

Thus, there is provided a simple, compact vent valve having a minimum overhead clearance, and having a pressure gage structure that is not apt to clog.

It will be understood that the valve V of the invention may be used without the pressure indicating gage G, in which case the bore 48, for example, may be plugged.

The terms and expressions which have been employed are used as terms of description, and not of limitation, and there is no intention, in the use of such terms and expressions, of excluding any equivalents of the features shown and described or portions thereof, but it is recognized that various modifications are possible within the scope of the invention claimed.

I claim:

1. A fluid pressure relief valve for the vent opening in a fluid storage tank including, an exhaust safety valve poppet disposed exteriorly of the tank and reciprocable to and from said opening to selectively seal the same, poppet bias means for retaining said poppet in a normally closed position against said opening, said poppet being displaceable to an open position when fluids interiorly of the tank exceed a predetermined pressure, said poppet having a vacuum vent aperture means leading from the tank interior to the tank exterior, a vacuum disk disposed on the underside of the poppet and reciprocable to and from said aperture means to selectively seal the same disk bias means for retaining said vacuum disk in a normally closed position against said aperture means, said vacuum disk being displaceable inwardly of the tank to open position when fluids interiorly of the tank fall below a predetermined pressure, said poppet containing an open-ended poppet bore connecting the tank interior with the tank exterior, a piston-type pressure gage rod reciprocally disposed in said poppet bore and adapted to selectively extend partially outwardly of the tank to indicate tank interior fluid pressures, pressure gage rod bias means for retaining the pressure gage rod substantially within the poppet bore when tank interior fluid pressure does not exceed pressure exteriorly of the tank, the vent opening being formed by an upstanding pipe member disposed in the top wall of the fluid storage tank, said valve further including a tubular valve body secured to the top of said pipe member, said valve body having an annular valve seat at the top end thereof forming the vent opening, said valve body having a plurality of support arms extending radially inwardly from the body, said valve body further including a vertically disposed guide sleeve secured to the inner end of the arms, said guide sleeve having a centrally disposed longitudinal guide sleeve bore, said poppet including a poppet head having a poppet stem extending downwardly from the head and reciprocally disposed in said guide sleeve bore whereby the poppet head is reciprocable to and from said vent opening to selectively seal the same, said valve body containing a coacting open-ended metering orifice connecting the tank interior with the tank exterior for receiving pressurized gases therethrough for pressure unloading of the tank, said metering orifice being dimensioned to limit the flow of said pressurized gases therethrough to the capacity of the poppet when in fully opened position, and a pipe cap disposed on the outer end of said metering orifice when such orifice is not used for pressure unloading of the tank.

2. A fluid pressure relief valve for the vent opening in a fluid storage tank including, an exhaust safety valve poppet disposed exteriorly of the tank and reciprocable to and from said opening to selectively seal the same, poppet bias means for retaining said poppet in a normally closed position against said opening, said poppet being displaceable to an open position when fluids interiorly of the tank exceed a predetermined pressure, said poppet having a vacuum vent aperture means leading from the tank interior to the tank exterior, a vacuum disk disposed on the underside of the poppet and interiorly of the tank and reciprocable to and from said aperture means to selectively seal the same, disk bias means for retaining said vacuum disk in a normally closed position against said aperture means, said vacuum disk being displaceable inwardly of the tank to open position when fluids interiorly of the tank fall below a predetermined pressure, said poppet containing an open-ended poppet bore connecting the tank interior with the tank exterior, a piston-type pressure gage rod reciprocally disposed in said poppet bore and adapted to selectively extend partially outwardly of the tank to indicate tank interior fluid pressures, pressure gage rod bias means for retaining the pressure gage rod substantially within the poppet bore when tank interior fluid pressure does not exceed pressure exteriorly of the tank, said vent opening being formed by an upstanding pipe member disposed in the top wall of the fluid storage tank, said valve further including a tubular valve body secured to the top of said pipe member, said valve body having an annular valve seat at the top end thereof forming the vent opening, said valve body having a plurality of support arms extending radially inwardly from the body, said valve body further including a vertically disposed guide sleeve secured to the inner end of said arms, said guide sleeve having a centrally disposed longitudinal guide sleeve bore, said poppet including a poppet head having a poppet stem extending downwardly from the head and reciprocally disposed in said guide sleeve bore whereby the poppet head is reciprocable to and from said vent opening to selectively seal the same, said poppet bore being formed in said poppet stem and extending longitudinally therethrough, said valve body containing a coacting open-ended metering orifice connecting the tank interior with the tank exterior for receiving pressurized gases therethrough for pressure unloading of the tank, said metering orifice being dimensioned to limit the flow of said pressurized gases therethrough to the capacity of the poppet when in fully opened position, a pipe cap disposed on the outer end of said metering orifice when such orifice is not used for pressure unloading of the tank, said poppet stem having a dust hood secured to the upper side thereof, said hood being spaced from and covering the valve to keep dust therefrom, said stem having an outwardly extending annular flange on the lower end thereof, said poppet bias means including a coil spring encircling said guide sleeve and compressed between said support arms and said annular flange, said poppet head including an annular downwardly extending tapered collar spaced from and encircling the upper portion of said poppet stem to form an annular cavity therebetween, said cavity being open-ended at its lower end in communication with the tank interior, said vacuum vent aperture means including a plurality of apertures formed circumferentially in said head and in communication with said cavity, said vacuum disk being disposed on the underside of the poppet head and against said apertures in normally closed position, said collar having an annular groove formed in the lower portion of the inner surface thereof and encircling the upper portion of the stem, said disk bias means including a compressed tapered coil spring having its larger end secured in said groove and having its smaller end abutting against said disk to retain the same against said apertures in a normally closed position, said poppet stem containing an annular interior shoulder at the upper end of its poppet bore, said pressure gage rod having an outwardly extending annular rod flange ring adjacent and spaced from the lower end of the rod, said pressure gage rod bias means including a coil spring compressed between said shoulder and said rod flange ring, fluid seal packing means including packing and a coil spring disposed in the lower end of the poppet bore below the flange ring and disposed in the space between the pressure gage rod and the inner longitudinal wall of the poppet bore, and a rod nut secured to the lower end of the pressure gage rod and biasing said packing means in said space.